G. H. STILLSON.
APPARATUS FOR THE REDUCTION OF FISH SCRAP, KELP, AND THE LIKE.
APPLICATION FILED DEC. 21, 1915.
1,212,416. Patented Jan. 16, 1917.
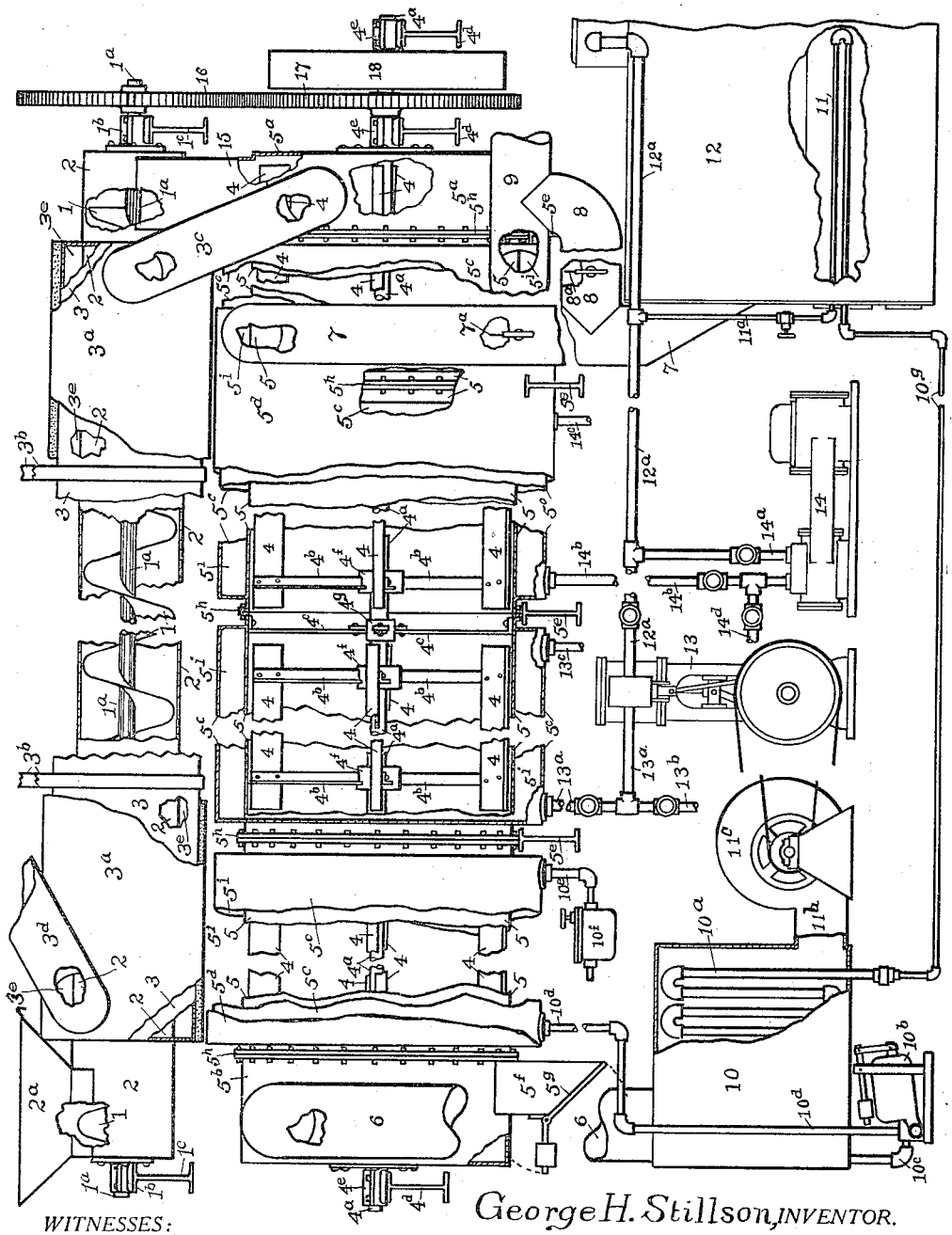
George H. Stillson, INVENTOR.
WITNESSES:
BY David E. Lain
ATTORNEY

UNITED STATES PATENT OFFICE.

GEORGE H. STILLSON, OF PORT TOWNSEND, WASHINGTON, ASSIGNOR TO PACIFIC PRODUCTS COMPANY, OF SEATTLE, WASHINGTON, A CORPORATION OF WASHINGTON.

APPARATUS FOR THE REDUCTION OF FISH-SCRAP, KELP, AND THE LIKE.

1,212,416.  Specification of Letters Patent.  Patented Jan. 16, 1917.

Application filed December 21, 1915. Serial No. 68,091.

*To all whom it may concern:*

Be it known that I, GEORGE H. STILLSON, a citizen of the United States, and a resident of Port Townsend, in the county of Jefferson and State of Washington, have invented certain new and useful Improvements in Apparatus for the Reduction of Fish-Scrap, Kelp, and the like, of which the following is a specification.

My invention relates to improvements in apparatus for reducing fish scrap, kelp and the like to their cooked and dried residue and the objects of my invention are to provide apparatus for accomplishing the desired result in the dry way which is suited to allow of controllable temperature variations in different parts of the same and also to so construct said apparatus that what is usually waste heat from accessory appliances can be used to aid in the accomplishment of said reduction.

The usual process for reducing fish scrap comprises cooking with steam in direct contact with said scrap, pressing the cooked scrap for the removal of oil, and then drying the press cake in rotary drums. In my process I do not permit the heating steam to come in contact with the scrap at any time, and I leave the oil in the scrap until it is dried when I degrease with a hydrocarbon solvent.

The apparatus by which I accomplish the above objects is illustrated in the accompanying sheet of drawing in which a side elevation of the several required appliances is shown and in which the same are closely grouped. Parts of the apparatus are shown in section on a medial, vertical plane, some parts are broken into in order to show others hidden thereby, and for lack of space, several transverse, vertical sections are broken away.

In general, my apparatus comprises a conveyer screw revolving in a cylinder, surrounded by a jacketed chamber, the delivery end of which connects with the receiving end of a drying cylinder in which revolve a paddle wheel, said drying cylinder being surrounded by sectional jacketed chambers. The boiler-furnace stack gases, and the exhaust steam from the engines, steam pumps, and steam coils used in the plant are separately used in the several jacketed chambers referred to, to aid in the reduction.

More particularly, the scrap is cooked in a screw conveyer comprising the screw 1 having the shaft $1^a$ mounted for rotation in bearings $1^b$, $1^b$ which are supported on I beams $1^c$, $1^c$. Said screw 1 revolves in stationary conveyer cylinder 2. Said cylinder is provided with a hopper $2^a$ at its receiving end and a chute 15 from the bottom of its delivery end. A conveyer—not shown—delivers the scrap into hopper $2^a$. A tight jacket 3 encompasses cylinder 2. The chamber $3^e$ between cylinder 2 and jacket 3 has an inlet orifice near the delivery end of cylinder 2 connected to an air pipe $3^c$. Said chamber also has an outlet orifice near the receiving end of cylinder 2 connected to a waste-air pipe $3^d$. In addition to the supports provided by I beams $1^c$, $1^c$, said screw conveyer is further supported by hangers $3^b$, $3^b$. A non-conducting covering $3^a$ incloses the jacket 3.

The drying cylinder consists of four similar sections 5, 5, 5, 5 having end flanges $5^h$, $5^h$, etc., joined concentrically. Each of said sections has a separate steam-tight jacket $5^c$, $5^c$, $5^c$, $5^c$. Over all is placed the non-conducting covering $5^d$. The receiving end of said drying cylinder is closed with the cap $5^a$. Said cap receives the scrap chute 15 into its upper side, and it is connected to jacket 3 by air conduit $3^c$. Each of the four sections of the drying cylinder is occupied by a paddle wheel having four angle-bar blades, 4, 4, 4, 4 attached to arms $4^b$, $4^b$, etc., which radiate from hubs $4^f$, $4^f$, etc. Said hubs are rigidly mounted on a central longitudinal shaft $4^a$. Said shaft is mounted for rotation in outside bearings $4^e$, $4^e$, $4^e$, and in inside bearings $4^g$, $4^g$, $4^g$, only one of which is shown. Said inside bearings are the hubs of spiders $4^c$, $4^c$, etc. These spiders are installed between said paddle wheels near the flanges $5^h$, $5^h$, $5^h$. Shaft $4^a$ has the gear wheel 17 rigidly attached near one end which engages with a gear wheel 16, rigidly attached to the neighboring end of shaft $1^a$. Pulley 18 is rigidly mounted on shaft $4^a$.

The paddles 4, 4, etc. are each set at a small angle with the elements of the drying cylinder, that is, each is set tangent to a helix, and the several helices to which the several blades are tangent are concentric with the drying cylinder and parallel with each other.

The cap $5^b$, at the delivery end of cylinder 5 has in its bottom the scrap outlet $5^f$. This outlet is automatically closed by the hinged bottom $5^g$ overbalanced with a counterweight. An air-heater chamber 10 is occupied by steam coils $10^a$. Said chamber finds an outlet through air conduit 6 which connects the top of said chamber with cylinder cap $5^b$. Blower $11^c$ forces ambient air through its outlet $11^b$ into the bottom of chamber 10, thence through chamber 10 and pipe 6, into cylinder 5. Blower $11^c$ is driven by steam engine 13. Said engine also furnishes power to drive all the running mechanisms in the plant requiring it, including the screw conveyer, paddle wheels, conveyers to hopper $2^a$ and from outlet $5^f$, etc. Much of this auxiliary apparatus as well as the power connections to drive it are not shown. A furnace and boiler 12 furnish steam for heating-coils $10^a$, engine 13 and steam pump 14. The refuse gases of combustion from furnace 12 are caused to enter one end of the jacketed chamber $5^1$ surrounding the first section of the drying cylinder 5, counting from the right, through gas duct 7 and said gases leave said chamber through gas duct 9 which enters the furnace stack, not shown. A by-pass duct 8 connects conduits 7 and 9. Duct 8 has a tight damper $8^a$. Duct 7 has a tight damper $7^a$ above its union with duct 8. By properly setting said dampers, more or less of the waste gases from the furnace can be turned into said jacketed chamber as desired. The exhaust steam from steam pump 14 is caused to enter the jacketed chamber around the second section of cylinder 5 through pipe $14^b$, and the waste from said exhaust steam leaves said chamber through outlet pipe $14^c$. An exhaust pipe $14^d$ is connected to pipe $14^b$. Pipe $14^d$ has a valve. A valve is also placed in pipe $14^b$ above its union with pipe $14^d$. By properly setting these two valves more or less of the exhaust steam from pump 14 is caused to enter said chamber as desired. The exhaust steam from engine 13 is caused to enter the jacketed chamber surrounding the third section of cylinder 5 through pipe $13^a$. The waste from said exhaust steam leaves said chamber through pipe $13^c$. An exhaust pipe $13^b$ is connected to pipe $13^a$. Pipe $13^b$ is fitted with a valve. A valve is placed in pipe $13^a$ above its union with pipe $13^b$. The proper setting of these two valves will cause more or less of the exhaust steam from engine 13 to enter said jacketed chamber as desired. A steam pipe $11^a$ connects main steam pipe $12^a$ with the superheater coil 11 in furnace 12. A pipe $10^g$ connects said superheater coil with steam coils $10^a$. The exhaust steam from coils $10^a$ enters tilting steam trap $10^b$ through pipe $10^c$. Here the water is separated from the steam which passes into the jacketed chamber surrounding the fourth section of cylinder 5 through pipe $10^d$. The waste from said steam leaves said chamber through pipe $10^e$ and enters relief trap $10^f$. The hot blast of air from air heater 10 enters the upper part of cap $5^b$ through air duct 6. After said hot blast passes through and among the agitated and cascading scrap in drying cylinder 5 it leaves the other end of said cylinder through air duct $3^c$ and enters the jacketed chamber surrounding conveyer cylinder 2. After passing the entire length of said chamber it leaves through outlet pipe $3^d$.

To use my reducing apparatus, it is assumed that a suitable steam pressure is available in boiler 12 and all other parts of the apparatus are in normal operation. Then fresh scrap delivered into hopper $2^a$ is slowly advanced in hot cylinder 2 by the screw 1 until it finally leaves said cylinder in a thoroughly cooked condition through chute 15 and drops into the receiving end of cylinder 5. Here the mass is caught up by the slowly revolving angle-bar paddles 4 and agitated and cascaded thereby until the moisture therein is entirely removed by the joint action of the heat of said cylinder and the heating and absorbative ability of the passing air. Because of the inflowing scrap at the receiving end, the agitation of said scrap in said cylinder and the above mentioned inclination of said paddles, the scrap is carried toward the delivery end of cylinder 5 during the drying thereof. The quantity caused to enter the cylinder, the rate of revolution of the paddles and the temperatures of different sections of said cylinder are so adjusted that by the time the scrap is completely dried it is flowing out of the automatically closed outlet $5^g$.

Having thus described my invention, what I claim as new and desire to secure by Letters Patent is:

1. In combination, a conveyer screw, a conveyer cylinder, a jacketed chamber surrounding said conveyer cylinder, a drying cylinder, a delivery chute connecting the delivery end of said conveyer cylinder and the receiving end of said drying cylinder, a revoluble paddle wheel in said drying cylinder, means to force a hot blast of air through said drying cylinder, and means to cause a heating medium to pass through the jacketed chamber surrounding said conveyer cylinder.

2. In combination, a conveyer screw, a conveyer cylinder, a jacketed chamber surrounding said conveyer cylinder, a drying cylinder, a chute connecting the delivery end of said conveyer cylinder with the receiving end of said drying cylinder, a jacketed chamber surrounding said drying cylinder, a paddle wheel mounted for revolution in said drying cylinder, means to cause a blast of hot air to pass lengthwise through said drying cylinder, means to cause a heating medium to pass lengthwise through the jacketed chamber around said conveyer cylinder, means to cause a heating medium to pass lengthwise through the jacketed chamber around said drying cylinder, and means to cause said conveyer screw and said paddle wheel to revolve in timed relation.

3. In combination, a conveyer screw, a conveyer cylinder, a jacketed chamber surrounding said conveyer cylinder, a drying cylinder, a chute between the delivery end of said conveyer cylinder and the receiving end of said drying cylinder, jacketed chambers in separate sections surrounding said drying cylinder, means to cause heating mediums of differing characters and temperatures to separately enter the jacketed chambers surrounding said drying cylinder, means to cause a heating medium to enter the jacketed chamber surrounding said conveyer cylinder, a paddle wheel mounted for revolution in said drying cylinder, and means to cause said paddle wheel and said conveyer screw to revolve in timed relation.

4. In combination, a conveyer screw, a conveyer cylinder, a jacketed chamber surrounding said conveyer cylinder, a drying cylinder, a chute connecting the delivery end of said conveyer cylinder with the receiving end of said drying cylinder, sectional jacketed chambers surrounding said drying cylinder, a paddle wheel mounted for rotation in said drying cylinder, a communicating air duct between said drying cylinder and said jacketed chamber surrounding said conveyer cylinder, means to cause a blast of hot air to pass through said drying cylinder and said jacketed chamber around said conveyer cylinder, means to cause the waste stack gases from a boiler furnace to pass through one of the sectional jacketed chambers around said drying cylinder, means to cause the exhaust steam from steam-using mechanisms to separately pass through the remaining said sectional jacketed chambers around said drying cylinder, and means to cause said conveyer screw and said paddle wheel to revolve in timed relation.

5. In combination, a conveyer screw, a conveyer cylinder, a hopper on the receiving end of said conveyer cylinder, means for mounting said screw for rotation in said cylinder, a jacketed chamber around said conveyer cylinder, an air duct leading out of one end of said jacketed chamber, a drying cylinder, a communicating chute between the delivery end of said conveyer cylinder and the receiving end of said drying cylinder, an air duct leading from one end of said drying cylinder into the other end of said jacketed chamber around said conveyer cylinder, a paddle wheel mounted for rotation in said drying cylinder, sectional jacketed chambers around said drying cylinder, an automatically closable chute leading from the bottom of the other end of said drying cylinder, means to close the ends of said drying cylinder, an air-heating chamber, a communicating air duct between said air-heating chamber and said drying cylinder, steam coils within said air-heating chamber, means to force a blast of air through said heating chamber, said drying cylinder and the said jacketed chamber around said conveyer cylinder, controllable means to cause the waste stack gases from a boiler furnace to pass through one of the sectional jacketed chambers around said drying cylinder, controllable means to cause the exhaust steam from a steam pump to pass through a second one of the said sectional jacketed chambers, controllable means to cause the exhaust steam from a steam engine to pass through a third one of said sectional jacketed chambers, means to cause the waste steam from said steam coils to pass through a fourth one of said sectional jacketed chambers, and means to cause said conveyer screw and said paddle wheel to revolve in timed relation.

6. In apparatus of the character described comprising a screw conveyer surrounded by an annular chamber, said screw conveyer having a chute connection with a closed drying cylinder, and a closed drying cylinder having a paddle wheel mounted for revolution therein, the combination of said screw conveyer, said drying cylinder, said paddle wheel, said chute connection, a duct connecting said annular chamber with said drying cylinder, and means to cause a heating medium to pass through said drying cylinder and into and through said annular chamber, with means to cause the screw of said screw conveyer and said paddle wheel to revolve in timed relation.

7. In apparatus of the character described comprising a screw conveyer having a surrounding chamber and a closed drying cylinder having surrounding chambers in separate sections, said drying cylinder also having a paddle wheel mounted for revolution therein, the combination of said screw conveyer, a chute connection between the conveyer cylinder of said screw conveyer and said drying cylinder, a conduit connection between the surrounding chamber of the screw conveyer and the drying cylinder, said paddle wheel, said closed drying cylinder, means to cause a heating medium to flow through said drying cylinder said conduit connection and said chamber around said conveyer cylinder, and means to cause heating mediums of controllable volumes to separately enter the separate chambers around said drying cylinder, with means to cause said paddle wheel and the screw of said screw conveyer to revolve in timed relation.

Signed at Port Townsend in the county of Jefferson and State of Washington this 4th day of December A. D. 1915.

GEORGE H. STILLSON.

Witnesses:
T. S. LIPPY,
B. WRIGHT.

Copies of this patent may be obtained for five cents each, by addressing the "Commissioner of Patents, Washington, D. C."